Patented May 31, 1949

2,471,400

UNITED STATES PATENT OFFICE 2,471,400

PREPARATION OF 1-NAPHTHYLAMINE-2-SULFONIC ACID

Robert Carland Conn, Bound Brook, and Robert Herbert Weiss, Plainfield, N. J., assignors to American Cyanamid Company, New York, N. Y., a corporation of Maine No Drawing. Application June 21, 1947, Serial No. 756,339

3 Claims. (Cl. 260—508)

This invention relates to an improved method for the preparation of 1-naphthylamine-2-sulfonic acid and its salts from salts of naphthionic acid.

In the past, 1-naphthylamine-2-sulfonic acid has been prepared by heating sodium naphthionate at 200° C. which results in a rearrangement of the 1-naphthylamine-4-sulfonic acid salt to the 1-2 isomer. The processing gives considerable difficulty because of decomposition and bad yields. Some of the disadvantages are probably due to the difficulty of heating a solid uniformly. Much higher yields have been obtained in the past by using a high boiling diluent such as naphthalene. This improves the heat transfer and renders the reaction smoother, but in turn involves the serious practical disadvantage resulting from the removal of the diluent and isolation of the product. The usual procedure after reaction is complete is to allow the mixture to solidify, grind it fine, and disperse it in water to dissolve the product. This presents the problem of separating the naphthalene from the aqueous mixture. Steam distillation may be employed but is expensive. Filtration may be used provided the temperature is maintained high enough to keep the product in solution, but not high enough to liquefy the naphthalene, which melts at 80°. Even with this control the separation is never complete and must be followed by solvent extraction and a further filtration with charcoal and an adsorbent to remove color and the last traces of naphthalene. The use of other inert high-boiling solvents presents similar difficulties of isolation and recovery, whether they be liquid or solid at room temperature.

The present invention is based on the discovery that if relatively low-boiling inert water-immiscible organic liquids are used, the disadvantages of the prior process are avoided. Water may be removed azeotropically during the reaction and after it is complete and the mixture cooled and filtered, the filter cake may be freed of naphthylamine and other decomposition products by washing with the solvent followed by removal of adherent solvent by a current of air.

The liquids which may be used include a number of mononuclear aromatic liquids. They must, however, possess certain definite characteristics which are essential to the satisfactory operation of the present process. The first requirement is that they have a boiling point which does not substantially exceed 150° C. Secondly, they must have good thermal stability. Third, they must be substantially immiscible with water. Fourth, they must be stable against reaction with either the sodium naphthionate or sodium 1-naphthylamine-2-sulfonate. All of these properties are necessary, but fortunately they are shared by a number of readily available mononuclear aromatic liquids among which are included benzene, its homologues, toluene and xylene, chloro and fluorobenzene, thiophene, and its lower homologues, the thiotolenes.

The process of the present invention does not materially alter the reaction temperatures used which in general will fall approximately in the range of 175 to 250° C. The reaction, of course, proceeds under pressure in an autoclave.

A very important feature of the process of the present invention and probably one of the important factors in its improved results lies in the rapid and complete removal of water. This is quite a problem ordinarily because the water of hydration present in commercial sodium naphthionate is tenaciously held. Nevertheless, we have found that if this is not rapidly removed in the process of the present invention, the reaction is interfered with. Removal is, however, a simple matter which may be effected by bleeding vapor from the mixture at the beginning of the reaction. This dehydration proceeds azeotropically with smoothness and completeness and is one of the advantages of the process of the present invention.

It is desirable to operate the process of the present invention in two steps. The first is a heating up step with azeotropic dehydration which is preferably effected by bleeding off the water vapors when a temperature of about 175–200° C. is reached. If necessary, the heating may be repeated. After the water is removed, the reaction temperature is raised to 190–250° C. and maintained there until completion of the reaction. As in most reactions taking place in a liquid medium, agitation is desirable and the autoclave in which the process of the present invention is carried out should preferably be provided with efficient stirrers.

The invention will be described in greater detail in conjunction with the following specific examples. Parts are by weight.

*Example I*

2200 parts of chlorobenzene and 660 parts of sodium naphthionate are heated to 200° C. in an autoclave. The valve is opened to permit the distillation of 440 parts of the solvent, which contains approximately 30 parts of water. The temperature is raised to 225°, at which point an additional 100 parts of distillate is collected; this contains little or no water. The charge is then held with stirring at 225° for five to six hours, cooled, and filtered. The cake of sodium 1-naphthylamine-2-sulfonate is washed on the filter with 550 parts of fresh chlorobenzene and dried. The cake is then purified by dissolving at 85-100° C. in 12,000 parts of water containing 90 parts of 28% ammonia, distilling off any residual chlorobenzene, filtering with charcoal, and adding 2400 parts of sodium chloride to crystallize the sodium salt.

*Example II*

A mixture of 1750 parts of commercial mixed xylene (B. P. 132-142° C.) and 660 parts of sodium naphthionate (95.5% purity) is heated in an autoclave to 200° C., and 260 parts of solvent distilled out. The temperature is raised to 225° C. and an additional 175 parts of solvent distilled out. The total distillate contains approximately 20 parts of water. The reaction is then continued with agitation until complete. After cooling, the product is filtered, washed with an additional 435 parts of xylene, and dried.

We claim:

1. In the preparation of sodium 1-naphthylamine-2-sulfonate from sodium naphthionate, the improvement which comprises heating sodium napthionate in an inert, neutral, water-immiscible, volatile, organic solvent having a boiling point not exceeding 150° C., to temperatures between 190° and 250° C., under pressure, the said solvent being selected from the class consisting of benzene, and the alkyl and halogen substituted benzenes having a boiling point not exceeding 150° C.

2. The process of claim 1 wherein said solvent is chlorobenzene.

3. The process of claim 1 wherein said solvent is xylene.

ROBERT CARLAND CONN.
ROBERT HERBERT WEISS.

REFERENCES CITED

The following references are of record in the file of this patent:

UNITED STATES PATENTS

| Number | Name | Date |
|---|---|---|
| 2,320,461 | Murray | June 1, 1943 |

FOREIGN PATENTS

| Number | Country | Date |
|---|---|---|
| 56,563 | Germany | Jan. 21, 1890 |
| 72,883 | Germany | Nov. 26, 1892 |